Nov. 15, 1955   B. M. HARRISON   2,724,099
SIGNALLING APPARATUS
Filed June 26, 1942   3 Sheets-Sheet 2
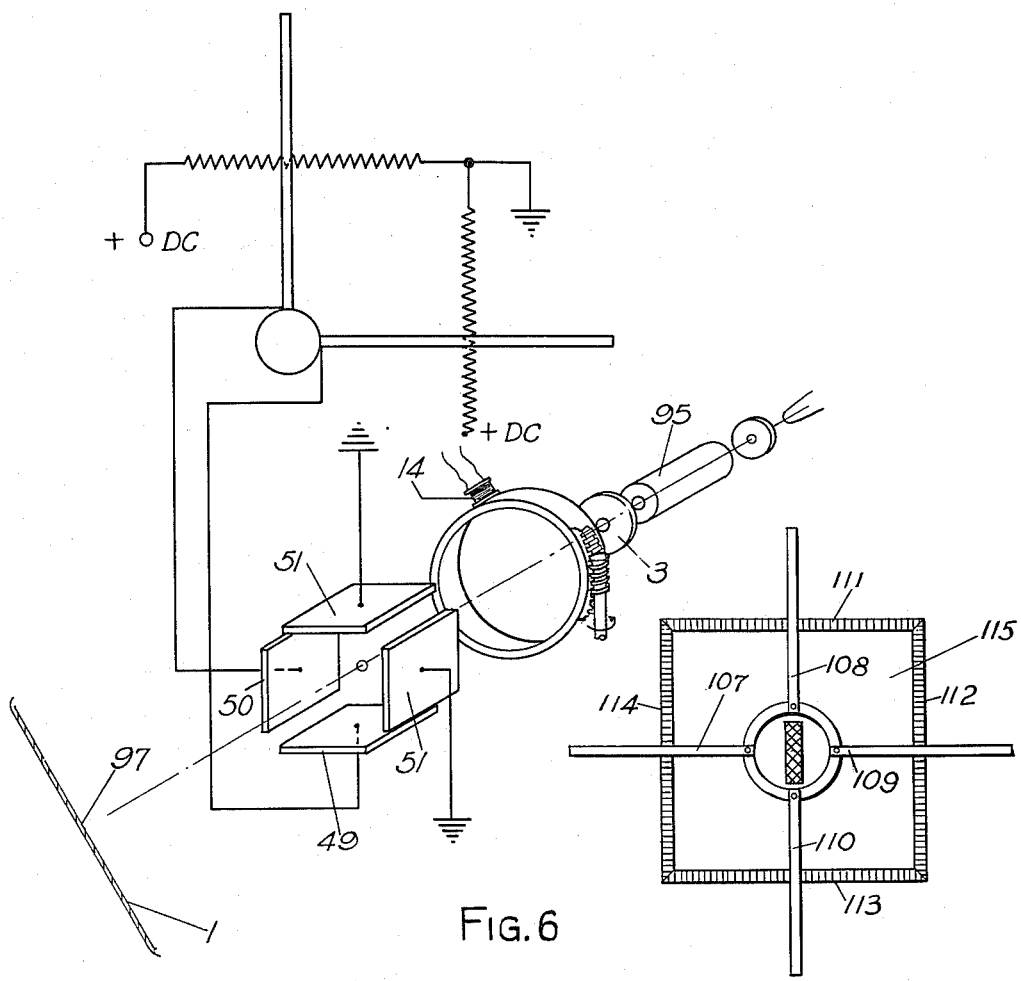
FIG. 6
FIG. 4
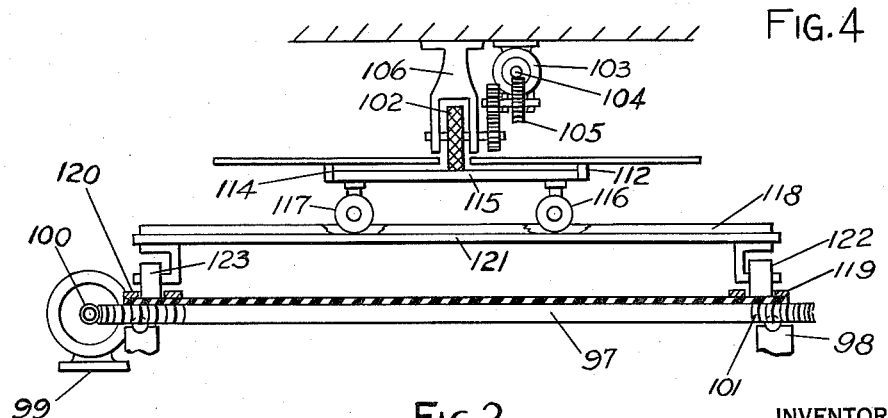
FIG. 2
INVENTOR
BERTRAM M. HARRISON
BY
ATTORNEY Nov. 15, 1955   B. M. HARRISON   2,724,099
SIGNALLING APPARATUS Filed June 26, 1942   3 Sheets-Sheet 3

INVENTOR
BERTRAM M. HARRISON
BY
ATTORNEY

United States Patent Office 2,724,099
Patented Nov. 15, 1955

2,724,099
SIGNALLING APPARATUS

Bertram M. Harrison, Wellesley Hills, Mass., assignor, by mesne assignments, to Raytheon Manufacturing Company, a corporation of Delaware Application June 26, 1942, Serial No. 448,669

13 Claims. (Cl. 340—3)

The present invention relates to a system for providing absolute position and course indication of two vessels, one on which the system is mounted and the other the vessel being observed such, for instance, as a hostile submarine or other vessel.

While the present invention has particular application to naval and military maneuvers, it may also be applied to commercial uses, particularly for determining in a fog or under other low visibility conditions the presence and position of neighboring vessels or obstacle or signal markings in the navigation of a commercial craft in order to avoid collision and also to steer a desired course.

The present invention has particularly for its aim the construction of a system which is simple, durable and easily operative by the personnel of a vessel. Further, such a system to be of greatest merit and utility must indicate the position and course of the vessel at all times so that the officer in charge of the vessel on which the equipment is mounted may have before him a picture of what is happening during the maneuvering of both vessels with reference to the compass directions. This is particularly important in following the course of a submarine and planning an attack against it, since the submarine, particularly when under water, because of its slower speed is maneuverable in shorter arcs, and therefore unless the courses are clearly plotted and up to the second, the submarine may in a sharp maneuver avoid the pursuing vessel.

The present system combines in its operation devices for distance measurement and direction determination preferably employing directive supersonic equipment of well-known and commonly used construction. Such apparatus may be of the magnetostriction, piezoelectric, dynamic or other directive supersonic types, or a combination of directive and non-directive receiving or sending apparatus, whichever may be found more convenient on the vessels on which the installation is made, may be used. It is possible also to use supersonic apparatus already used and installed upon the vessel, for instance, the rotating directive projectors of the magnetostriction or piezoelectric type. Such individual units may be used both for sending and receiving or the sending and receiving units may be separated and used in various combinations which do not particularly in themselves form the subject matter of the present invention.

The present invention will be more fully described in the specification below by reference to the drawings made a part thereof in which:

Fig. 2 shows a portion of the mechanism of Fig. 1 in completer detail than that shown in Fig. 1;

Fig. 4 illustrates a detail of Fig. 2;

Fig. 6 shows a diagrammatic detail of some elements in the system indicated in Fig. 1.

Figure 1:
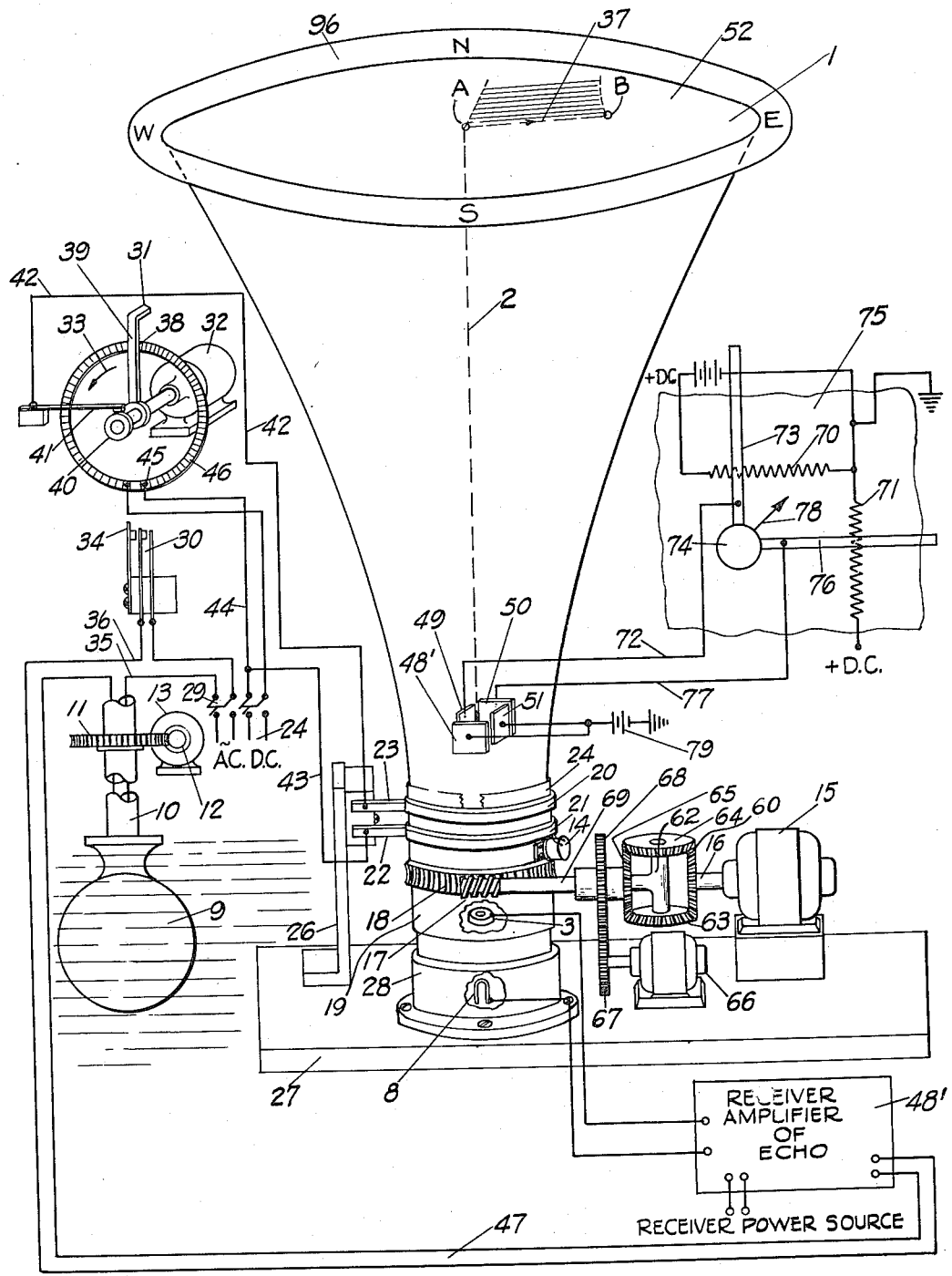
Fig. 1 shows a schematic diagram of the system.

In the general system as indicated in the figures there is a cathode ray tube 1 which is provided with the usual cathode 8 from which emanates the cathode ray beam 2 which may be controlled by means of a suppressor grid 3 to suppress or pass the cathode ray beam and the usual pairs of plate electrodes 48 and 50, and 49 and 51 in place of which deflecting coils may be used. This cathode ray beam in the present system may be used both to indicate the position of the observing vessel and the vessel being observed. The system includes also means for determining the distance and direction of the vessel being observed.

This may include a sound projector 9 by means of which a sound wave impulse of a group of high frequency oscillations may be sent out directively against the object whose distance and direction are to be determined. This projector, which may be immersed in the water, is rotated by a shaft 10 through a suitable gearing system which is indicated in Fig. 1 by the gear 11 and worm 12 driven by a motor 13. Direction is determined by the position of the projector 9. If a sound beam is sent out by the projector and an echo is received from the object on the projector 9 or some other receiver, then it will be known that the direction of the vessel being observed is in the direction of the beam of sound emitted from the projector 9. The directive sound axis of the projector will be relatively indicated by the swing of the cathode beam 2, the direction of which is controlled by the magnetic field impressed upon the tube by means of the magnet 14. For this purpose the motor 15 and the motor 13 preserve their identical position. The motor 15 drives through the shaft 16 the gear 60 of the differential 62. This differential comprises the gears 63 and 64 meshing with the gear 60 on the one side and the gear 65 on the other side, which latter gear is driven by the compass repeater motor 66 through the equal ratio gears 67 and 68. If the compass motor is still, the gears 63 and 64 carried by the shaft 69 drive the worm pinion 17 at the same rate as the shaft 16. However, if the ship is turning, the compass repeater motor 66 will rotate, compensating for the turn of the vessel so that the angles referring to the compass directions on the cathode ray tube will always give the cathode ray beam the true bearing corresponding to the true bearing of the projector beam.

The worm wheel 17 drives the gear 18 to which is attached the collar 19 on which the magnetic coil 14 is mounted. The collar 19 also carries two slip rings 20 and 21 to which current is supplied by means of the brushes 22 and 23 supported by bracket 26. The brushes 22, 23 are connected to the direct current supply source 24 in the manner about to be described for energizing the magnet 14.

The slip rings 20 and 21, the collar 19, and the magnet 14 are all rotated through the gear 18 positioned freely over a stationary collar 24 attached to the cathode ray tube. The collar may be supported by the base 27 on which the tube itself is mounted in the holder 28.

The radial direction of the magnet 14 therefore corresponds in compass direction with reference to the indications adjacent the face 52 of the cathode ray tube to the absolute sound directive axis of the projector 9. A sound signal is sent out (assuming the alternating current switch 29 is closed) when the contact key 30 is momentarily closed by action of the arm 31 which is rotated by the motor 32 in the direction of the arrow 33, brings the contacts of the switch 30 together as the spring arm 34 is forced to the right (Fig. 1), thus completing the electrical circuit to the projector 9 over the wires 35 and 36. At the same time that a sound wave is sent out, the current through the coil 14 increases, drawing the cathode ray beam 2 across the face of the tube in the direction indicated by the arrows 37. The current increases in the coil 14 in accordance with the increase of voltage impressed upon the coil. This is effected by means of the contact brush 38 attached to the radial bar 39 which also carries the arm 31. This bar 39 is electrically connected with the conducting ring 40 upon which bears the brush 41 which is connected through the line 42 to the terminal of the brush 23 which is one connection for the coil 14. The other connection for the coil 14, namely, the connection 43, is connected through the direct current supply to the line 44 which terminates at one end 45 of the resistance 46. As the arm 39 and its contact member 38 pass by the point 45, the potential across the coil 14 gradually increases and therefore the current through the coil. This increase is so adjusted that the position of the cathode ray beam on the face of the tube travels at half the speed of the sound wave in the medium, for instance, water, in which the observation is being made. To attain this result, the speed of the motor 32 must, of course, be maintained constant. When the reflecting echo returns to the projector 9 or to an independent receiver if desired, its impulse is conducted over the line 47 to the receiver amplifier 48' from whence the signal is impressed upon the grid 3 of the cathode ray tube. This grid may act to suppress the cathode ray beam except at such times as the signal is received or the receiver amplifier may provide a serration of the cathode ray beam by use of an indicating electrode, or by impressing the potential on one of the cathode ray plates 48, 49, 50 or 51. The distance, therefore, between the point A and the point B will provide on the cathode ray tube face 52 a measure of the distance between the observing vessel which is at the point A and the observed vessel which is in the point B. The face of the cathode ray tube 52 may be provided with some fluorescent material which will permit the image of these two points to persist for a desired length of time so that successive points of observing vessel A and the observed vessel B will form a track course of the two vessels.

In the system so far described the position of the point B corresponding to the observed vessel is established from the point A which is the observing vessel. The position of the observing vessel or the point A is established through the control of the two pairs of plates 48 and 50, 49 and 51. These plates are connected to the rectangularly-arranged resistors 70 and 71 in the manner about to be described.

The plate 49 is connected by the conductor 72 to the conducting arm 73 carried by the element 74 which maintains a constant position but drives the plate 75 upon which the resistors 70 and 71 are mounted in a direction corresponding to the reverse of the direction that the vessel is proceeding and at a proportional speed. The arm 76 connecting with the resistor 71, also carried by the element 74, is connected by means of the conductor 77 to the deflecting plate 50. The other two deflecting plates 48 and 51 are connected to ground through the biasing battery 79 while the junction of the resistors 70 and 71 is also grounded. By means of this arrangement component voltages are impressed across the plates 48 and 50 and 49 and 51 corresponding to the position of the element 74 with reference to the plate 75 corresponding to the motion of the craft over the water or other medium. If the vessel, as illustrated by the element 74, is therefore traveling in the direction of the arrow 78 with respect to the plate 75, which, of course, means that the plate 75 is moving in the opposite direction, then the voltage impressed between the plates 49 and 51 will decrease and similarly the voltage across or between the plates 48 and 50 so that ultimately the voltage across the plate electrodes of the cathode ray tube would be zero and the beam would occupy a central position but for the additional biasing battery 79 which may be used to position the cathode ray beam 2 initially in the center of the tube when the element 74 is in the center of the square formed by the resistors 70 and 71.

Figures 3, 5:
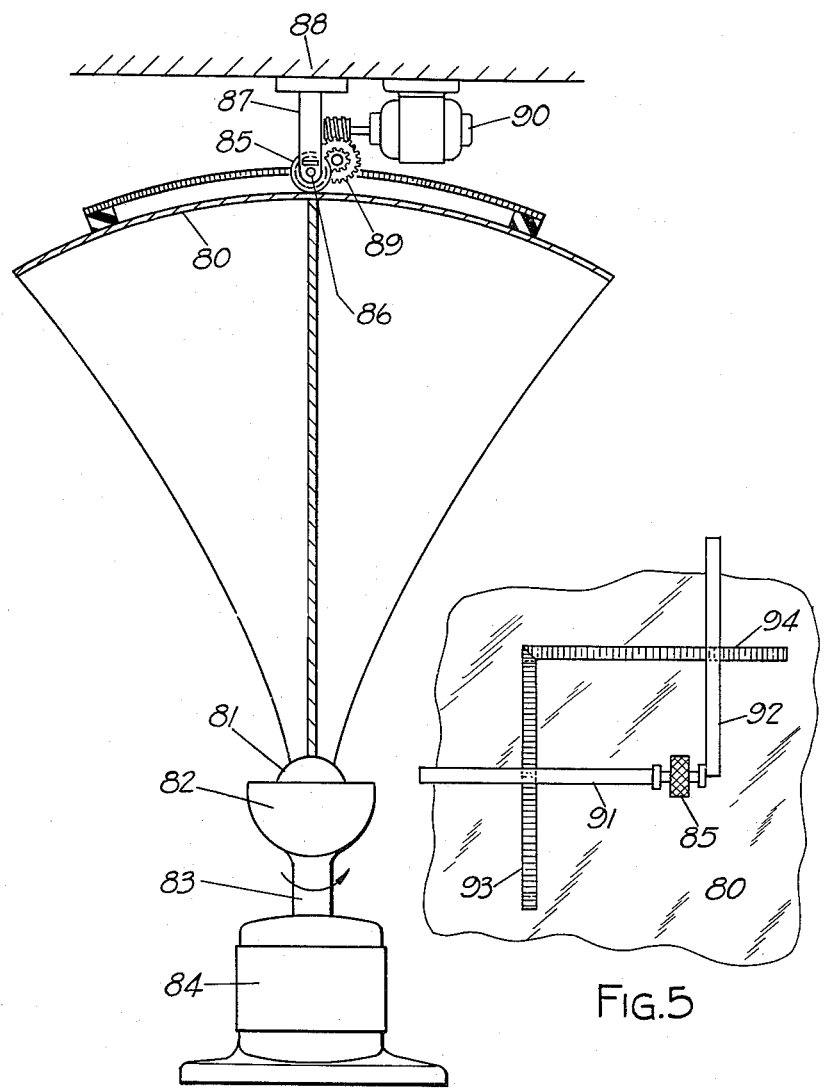
Fig. 3 illustrates a modified form of the apparatus shown in Fig. 2.
Fig. 5 illustrates a detail of Fig. 3.

The element 74 and its associated parts are shown more in detail in Figs. 2, 3, 4 and 5. In Fig. 3 there is shown a sector of a sphere 80 which is mounted in a universal joint 81, 82, the mounting 82 being rotated about a vertical axis by means of the shaft 83 controlled and operated by the motor 84. This motor 84 repeats the direction of the heading of the ship with respect to the compass bearing and therefore orients the sector 80 of the sphere in the right direction. Engaging the surface of the sphere is a contact wheel 85. This contact wheel 85 is journaled in fixed bearings 86 supported by the bracket 87 mounted in fixed relation to some portion 88 of the vessel. The wheel 85 is driven through a set of gears 89 by the motor 90 so that the wheel 85 revolves at a speed corresponding to the speed of the vessel. The sector 80 of the sphere, therefore, is driven with respect to the fixed wheel 85 at a speed corresponding to the speed of the vessel in the direction of the heading of the vessel. The wheel 85, Fig. 5, and the supporting bracket 87 carry the fixed contact arms 91 and 92 corresponding to the arms 73 and 76 of Fig. 1, so that as the sector 80, whichs carries the resistors 93 and 94, corresponding to resistors 70 and 71 is moved, the voltages which are picked off between the contacts of the conductors 91 and 92 on the resistors 93 and 94 and ground are those impressed across the plates of the cathode ray tube. These voltages acting on the plates position the beam of the cathode ray tube so that the spot A marked on the face of the tube by the beam corresponds to the position of the wheel 85.

When, therefore, the ship's course is changed, the whole plate 80 will be rotated by the shaft 83 through the compass repeater motor 84. Since the motor 90 drives the wheel 85 proportional to the ship's speed, the sector 80 will be moved at a velocity corresponding to the ship's speed in the reverse direction from that in which the ship is heading, thus preserving at all times the relative position of the sector 80 and that of the vessel as represented by the wheel 85. In the initial operation of the device, the wheel 85 is set at the center of the sector 80 which positions the cathode ray beam 2 in the center of the face 52 of the cathode ray tube. The various elements of the system are lined up with each other so that the directive magnet 14 and the sector 80 correspond to the compass direction with reference to the direction of the projector 9; that is to say, when the directive axis of the sound projector points north, the magnet 14 should draw the beam in a northerly direction as registered on the face 52 of the cathode ray tube 1.

In Fig. 6 a layout is indicated showing in a general schematic fashion the arrangement of the elements of the cathode ray tube. The suppressor grid 3 may be inserted in a position after the tube 95 for concentrating the cathode ray beam. The directive magnet 14 may be placed between the suppressor grid 3 and the cathode plates 48, 49, 50 and 51 or it may be placed beyond the plates. The front plate of the cathode ray tube may be provided with a compass scale 96 and the face of the tube itself with the fluorescent material 97 for maintaining a persistence of the spot made by the cathode ray beam.

In the arrangement indicated in Figs. 2 and 4, a modification of the arrangement of Figs. 3 and 5 is shown. In Fig. 2 a flat disc 97 corresponding to the sector 80 of the sphere is used. This is supported by suitable ball bearing mountings 98 and is rotated by the motor 99 through the worm gear 100 which meshes with the ring gear 101 on the edge of the plate 97. The motor 99 is a compass repeater motor so that the orientation of the plate 97 gives the true compass bearing of the course of the vessel with reference to the driving wheel 102. The driving wheel 102 which is driven at the ship's speed is operated and controlled by means of the motor 103 mounted in fixed relation with the vessel which drives the worm gear 104 and, through a gear unit 105, the driving wheel 102. The driving wheel 102 is mounted in a suitable bearing and supported by the bracket 106, also in a fixed relation with the vessel. Similarly, as in Fig. 5, the driving wheel 102 and its supports carry the contact arms 107, 108, 109 and 110 bearing upon the resistance strips 111, 112, 113 and 114, respectively. The strips 112 and 114 may be connected in parallel and so also 111 and 113, in which case the arms 108 and 110 are placed at the same potential and so also the arms 107 and 109. The resistance elements 111, 112, 113 and 114 are mounted at the edge of the bearing plate 115 upon which the wheel 102 bears. This plate is supported by rollers 116 and 117 of which there may be four, one at each corner of the plate. These may operate on tracks 118 running in a direction at right angles to the tracks 119 and 120 on the surface of the plate 97 over which the platform 121 supported by the rollers 122 and 123 moves. The tracks 119, 120 on the plate 97 account for one rectangular component of the motion of the vessel, and the tracks 118 on the platform 121 account for the other rectangular component of motion of the vessel while the rotation of the plate 97 accounts for the heading of the vessel as effected by the bearing wheel 102. The wheel 102, it will be appreciated, maintains its position with respect to the plate 97 whereas the plate 115 which carries the resistance element is moved corresponding to the reverse direction of the ship through the water so that the position of the wheel 102 with reference to the plate 115 will indicate the ship's bearing upon the plate. Similarly, as previously described, this indication is transferred to the cathode ray beam to produce the desired positioning of the spot on the face of the tube.

Having now described my invention, I claim:

1. A system for indicating the position of an observing vessel together with an object being observed and their courses including orientable direction and distance-determining means, means including a cathode ray tube having a viewing surface for producing thereon an indication of the course and bearing of the observing vessel and means also including said cathode ray tube indicating on said viewing surface the position of the observed object, said cathode ray tube having a cathode ray beam with a plurality of plate electrodes for deflecting the beam in accordance with the bearing of the observing vessel, and means providing a magnetic field adapted to be rotated about the tube for deflecting said beam in accordance with the orientating of the direction and distance-determining means, means controlling the operation of the deflecting plate electrodes for determining the position of the observing vessel, and means effecting and controlling the rotation and energization of the magnetic field for indicating the position of the observed object on the face of said cathode ray tube.

2. A system for indicating the position of an observing vessel together with an object being observed and their courses including orientable direction and distance-determining means, means including a cathode ray tube having a viewing surface for producing thereon an indication of the course and bearing of the observing vessel and means also including said cathode ray tube indicating on said viewing surface the position of the observed object, said cathode ray tube having a cathode ray beam with a plurality of plate electrodes for deflecting the beam in accordance with the bearing of the observing vessel, means for impressing voltages on said plate electrodes corresponding to the position of the observing vessel, means providing a magnetic field for deflecting said beam in accordance with the orientation of the direction and distance-determining means for determining the distance and direction of the observed object, and means included in said cathode ray tube for indicating on the face thereof the position of said cathode ray beam.

3. In a system for indicating the position of an observing vessel and its course, means for indicating the position of the observing vessel including a cathode ray tube having a cathode ray beam with a plurality of plate electrodes for deflecting the beam to produce an indication of the position of the vessel, means providing a surface and positioned relative to the bearing of the vessel, means for moving said surface corresponding to the direction of the motion of the vessel at relatively the same speed, means electrically operated by the positioning of said surface with respect to the bearing of the vessel for providing component voltages corresponding thereto, and means for impressing said component voltages on said plate electrodes.

4. In a system for indicating the position of an observing vessel and its course, means for indicating the position of the observed vessel including a cathode ray tube having a cathode ray beam with a plurality of plate electrodes for deflecting the beam to produce an indication of the position of the vessel, means for establishing component voltages for controlling the plates of said cathode ray tube for determining the deflection of the beam comprising a table having resistance elements arranged at right angles thereon, fixed means carrying conductive elements engaging said resistance means and means for moving said table corresponding to the speed and direction of the motion of said vessel whereby the drops across said resistances to said conducting elements establish the position of said fixed means with respect to said table whereby said voltages impressed upon the plates of said cathode ray tube will indicate by the spot of the cathode ray beam the position of said vessel.

5. In a system for indicating the position of an observing vessel and an object being observed comprising means visually indicating the course of the observing vessel, means for directively transmitting a wave impulse from the observing vessel and receiving a reflection from the object being observed and means measuring the time interval elapsing and thereby determining the direction and distance of the object from the observing vessel, and means employing the said visual indicating element for indicating such direction and distance.

6. A system for indicating the position of an observing vessel and an object being observed comprising means visually indicating the absolute point to point position of the observing vessel, means for directively transmitting a wave impulse from the observing vessel and receiving a reflection from the object being observed and means measuring the time interval elapsing and thereby determining the direction and distance of the object from the observing vessel, and means operated therefrom employing said visual indicating means for indicating the absolute point to point position of said object.

7. In a system for indicating the position of an observing vessel, means providing a spherical surface, means supporting said spherical surface in its radial direction to permit universal motion of the same, including means for rotating said surface about a radial axis thereof, said rotation being synchronized with a compass bearing of the vessel, a frictional wheel, means mounting said frictional wheel and bearing against said spherical surface, and means for rotating said frictional wheel with its axis in a stationary position corresponding to the speed of the vessel whereby said surface will be moved in the direction of said bearing wheel at a speed corresponding to the speed of the vessel.

8. In a system for indicating the position of an observing vessel, means providing a platform corresponding to the surface of the medium in which the vessel is supported, means for rotating said platform corresponding to the compass bearing of the vessel, a bearing wheel having a fixed mounting axis such that the direction of the bearing wheel with respect to the platform corresponds to that of the surface with respect to the vessel, a bearing plate, means supporting said bearing plate on said platform, said means providing motional components having right angle directions whereby said bearing plate will be moved in the direction of the bearing wheel when the latter is rotating and means for rotating the bearing wheel corresponding to the speed of the vessel.

9. In a system for indicating the position of an observing vessel and an object being observed, in combination a cathode ray tube having means for producing a cathode ray beam, a pair of deflecting plates, means for energizing said deflecting plates with potentials producing a deflection corresponding to the variation in the position of the vessel and means for producing a deflection of the beam corresponding to the direction and the distance measurement of the object being observed.

10. In a system for indicating the position of an observing vessel, in combination a cathode ray tube having means for producing a cathode ray beam, a pair of deflecting plates, means for energizing said deflecting plates with potentials producing a deflection corresponding to the variation in the position of the vessel, said means comprising a pair of potentiometer wires positioned at right angles to each other and means moving in simulation of the vessel having a pair of right angle arms supplying potential to said plates corresponding to the simulated position of the vessel.

11. In a system for indicating the position of an observing craft and its course, means for indicating the position of the observing craft including a cathode ray tube having means for producing a cathode ray beam and a deflection system for deflecting said beam to produce an indication of the position of said craft, means providing a surface positioned relative to the bearing of the vessel, means for moving said surface corresponding to the direction of motion of the vessel at relatively the same speed, means electrically operated by the positioning of said surface with respect to the bearing of the vessel for providing signals corresponding thereto, and means for feeding said signals to said deflection system.

12. In a system for indicating the position of an observing craft and its course, means for indicating the position of the observing craft including a cathode ray tube having means for producing a cathode ray beam and a deflection system for deflecting said beam to produce an indication of the position of said craft, means providing an element on said craft moving relative to said craft at a speed functionally corresponding to the speed of said craft, and means for deriving signals from said element moving means functionally related to the speed of said craft and for applying said signals to said deflection system to produce deflection of said beam in accordance with changes in position of said craft.

13. In a system for indicating the position of an observing craft and its course, means for indicating the position of the observing craft including a cathode ray tube having means for producing a cathode ray beam and a deflection system for deflecting said beam to produce an indication of the position of said craft, means providing an element on said craft moving relative to said craft at a speed functionally corresponding to the speed of said craft, means for directively transmitting a wave impulse from the observing craft and receiving a reflection from the object being observed and for measuring the time interval elapsing for determining the direction and distance of the object from the observing craft, means for deflecting the said beam from an initial position controlled by the position of said element which corresponds to the position of said observing craft, the direction of deflection of said beam by said deflecting means corresponding to the direction of said object, said deflection being at a rate corresponding to the rate of travel of said wave impulse, and means for intensity modulating said beam to produce an indication on said tube corresponding to the range of said object with respect to said craft.

References Cited in the file of this patent

UNITED STATES PATENTS

| | | |
|---|---|---|
| 1,225,796 | Fricke | May 15, 1917 |
| 2,209,191 | Dearing | July 23, 1940 |
| 2,223,983 | Beers | Dec. 3, 1940 |
| 2,225,046 | Hunter | Dec. 17, 1940 |
| 2,231,929 | Lyman | Feb. 18, 1941 |
| 2,296,032 | Hammond | Sept. 15, 1942 |
| 2,332,881 | Woerner | Oct. 26, 1943 |

FOREIGN PATENTS

| | | |
|---|---|---|
| 490,599 | Great Britain | Aug. 16, 1938 |
| 546,202 | Great Britain | July 2, 1942 |